UNITED STATES PATENT OFFICE.

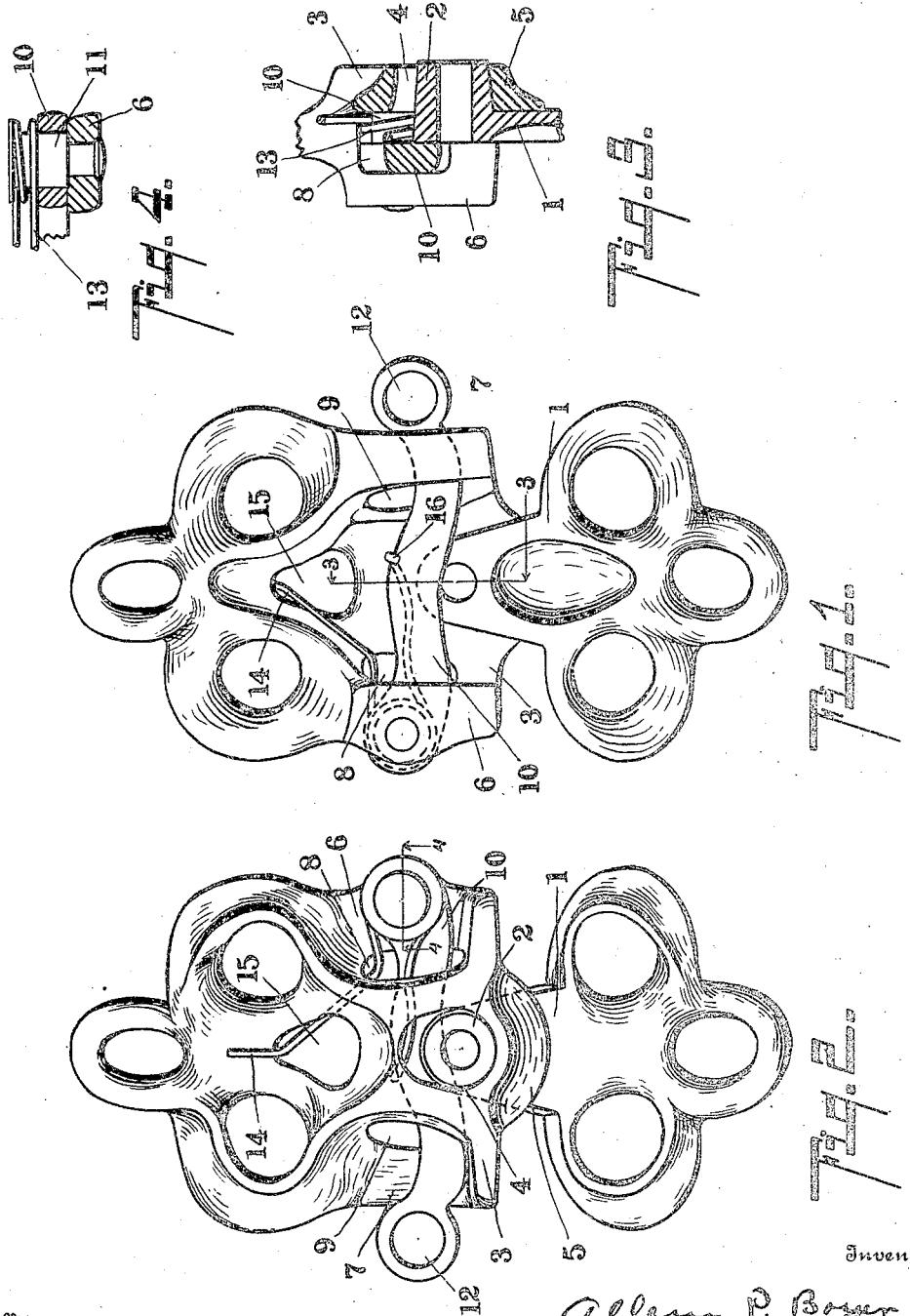

ALLEN P. BOYER, OF GOSHEN, INDIANA.

HAY-SLING LOCK.

No. 909,141.   Specification of Letters Patent.   Patented Jan. 12, 1909.

Application filed April 28, 1908. Serial No. 429,591.

*To all whom it may concern:*

Be it known that I, ALLEN P. BOYER, a citizen of the United States, residing at the city of Goshen, county of Elkhart, State of Indiana, have invented certain new and useful Improvements in Hay-Sling Locks, of which the following is a specification.

This invention relates to improvements in hay sling locks.

The main object of this invention is to provide an improved hay sling lock which is simple and compact in structure, and one which is very strong; also, one in which the parts may be easily and quickly engaged and also easily disengaged while under the strain of the load.

Further objects, and objects relating to structural details, will definitely appear from the detailed description to follow.

I accomplish the objects of my invention by the devices and means described in the following specification.

The invention is clearly defined and pointed out in the claims.

A structure embodying the features of my invention is clearly illustrated in the accompanying drawing, forming a part of this specification, in which, Figure 1 is a plan of my improved hay sling lock, it being shown substantially in full size as manufactured. Fig. 2 is an inverted plan thereof. Fig. 3 is a detail section, taken on a line corresponding to line 3—3 of Fig. 1, showing the hook member in engagement with the eye member. Fig. 4 is a detail section taken on a line corresponding to line 4—4 of Fig. 2, showing the arrangement of the latch pivot and latch spring, the pivot being shown in full lines.

In the drawing, the sectional views are taken looking in the direction of the little arrows at the ends of the section lines, and similar numerals of reference refer to similar parts throughout the several views.

Referring to the drawing, the hook member 1 is provided with a laterally-projecting engaging portion 2 at its outer end, the engaging portion being preferably cylindrical in form and slightly tapered, as is illustrated.

The eye member 3 is provided with an eye 4 adapted to receive the hook, the eye being large enough so that the hook is loosely engaged therein. The eye is also preferably provided with an outwardly-projecting portion 5 over which the hook member fulcrums, so that the members are readily disengaged when the latch is released. The eye member is provided with raised portions 6 and 7 at each side of the eye, and these raised portions have openings 8 and 9, respectively, therein adapted to receive the latch 10.

The latch 10 is mounted on a pivot 11 arranged on the inside of the raised portion 6. The swinging end of the latch is arranged through the opening 9 in the opposite raised portion and is provided with a hole 12 in which the trip rope may be engaged. The opening 9 is of such dimension that it holds the latch against lateral movement. By locating the pivot on the inside of the raised portion 6, it is protected so that it is not likely to be engaged on exterior objects; also the strain on the latch, instead of being borne by the pivot, is largely borne by the body of the eye member, the strain on the swinging end of the latch being also borne by the body of the eye member, or the raised portion 7 thereof. This arrangement securely supports both ends of the latch and provides an arrangement of the parts which allows the latch to be disengaged by comparatively slight movement, the friction of the hook member thereon being comparatively slight as it only engages on the end of the hook member. This also enables the making of the parts comparatively light in weight, and, at the same time, they possess very great strength. The latch is held normally in its engaging position by means of a spring 13, which is arranged on the latch pivot 11, one arm of the spring, as 14, being engaged through a hole 15 located centrally of the eye member, and the other arm, as 16, being engaged over the latch. This forms an effective support for the spring which may be made comparatively long and so located that it is practically impossible that it should be injured in use by becoming engaged with some object, or the like, it being entirely surrounded and protected by comparatively heavy parts, as will clearly appear from an inspection of the drawings. Another advantage of arranging the swinging end of the latch through the opening 9 is that effective stops for the latch are thereby secured.

While I have illustrated and described my improved hay sling lock in detail in the form preferred by me on account of its structural simplicity and convenience in use, I am aware that it is capable of considerable variation in structural details without departing from my invention.

Having thus described my invention, what I claim as new and desire to secure by Letters Patent is:

1. In a structure of the class described, the combination with a hook member having a laterally-projecting engaging portion; an eye member having an eye therein adapted to receive the engaging portion of said hook member, said eye member having raised portions relative to said eye at each side, said raised portions having transverse openings therein; a latch; a pivot for said latch arranged on the inside of one of said raised portions, the swinging end of said latch being arranged through the opening in the other raised portion, said opening being adapted to hold the swinging end of the latch against lateral movement, said latch being adapted to swing over the end of the hook when the same is engaged in the said eye; and a spring coiled about said latch pivot having one end arranged through a central opening in said eye member and the other engaged on said latch whereby the same is held normally in its engaging position, said eye and hook members being provided with holes adapted to receive the ropes to be connected.

2. In a structure of the class described, the combination with a hook member having a laterally-projecting engaging portion; an eye member having an eye therein adapted to receive the engaging portion of said hook member, said eye member having raised portions relative to said eye at each side, said raised portions having transverse openings therein; a latch; a pivot for said latch arranged on the inside of one of said raised portions, the swinging end of said latch being arranged through the opening in the other raised portion, said latch being adapted to swing over the end of the hook when the same is engaged in the said eye; and a spring whereby said latch is held normally in its engaging position, said eye and hook members being provided with holes adapted to receive the ropes to be connected.

In witness whereof, I have hereunto set my hand and seal in the presence of two witnesses.

ALLEN P. BOYER. [L. S.]

Witnesses:
E. E. MUMMERT,
GEO. M. RICHARDSON.